(12) United States Patent
Na et al.

(10) Patent No.: US 11,599,696 B2
(45) Date of Patent: Mar. 7, 2023

(54) METHOD AND APPARATUS FOR AUTOMATICALLY GENERATING BOILER COMBUSTION MODEL

(71) Applicant: DOOSAN ENERBILITY CO., LTD., Changwon-si (KR)

(72) Inventors: Sang Gun Na, Yongin-si (KR); Jwa Young Maeng, Yongin-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 448 days.

(21) Appl. No.: 16/804,191

(22) Filed: Feb. 28, 2020

(65) Prior Publication Data

US 2020/0320236 A1    Oct. 8, 2020

(30) Foreign Application Priority Data

Apr. 3, 2019    (KR) .................... 10-2019-0039191

(51) Int. Cl.
G06F 30/27    (2020.01)
(52) U.S. Cl.
CPC .................... *G06F 30/27* (2020.01)
(58) Field of Classification Search
USPC .......................................................... 703/18
See application file for complete search history.

(56) References Cited

U.S. PATENT DOCUMENTS

2019/0385070 A1* 12/2019 Lee ..................... F24F 11/64
2021/0286922 A1*  9/2021 Obara ............... G05B 23/0216

FOREIGN PATENT DOCUMENTS

| JP | 2007-271187 A | 10/2007 |
| JP | 2009-198136 A | 9/2009 |
| KR | 10-2016-0104481 A | 9/2016 |
| KR | 10-1737968 B1 | 5/2017 |
| KR | 10-1759622 B1 | 7/2017 |

OTHER PUBLICATIONS

A Korean Notice of Allowance dated Feb. 18, 2021 in connection with Korean Patent Application No. 10-2019-0039191 which corresponds to the above-referenced U.S. application.

* cited by examiner

*Primary Examiner* — Bryce M Aisaka
(74) *Attorney, Agent, or Firm* — Harvest IP Law LLP

(57) ABSTRACT

A method and apparatus for automatically generating periodic boiler combustion models and aperiodic boiler combustion models through automatic learning are provided. The method of automatically generating a boiler combustion model may include determining whether a specific event has occurred in association with a boiler, changing a training condition according to a result of the determining, generating a boiler combustion model trained on operation data measured in the boiler and stored in a database according to the training condition, and determining a precision of the generated boiler combustion model.

18 Claims, 6 Drawing Sheets

METHOD AND APPARATUS FOR AUTOMATICALLY GENERATING BOILER COMBUSTION MODEL

CROSS REFERENCE TO RELATED APPLICATION

This application claims priority to Korean Patent Application No. 10-2019-0039191, filed on Apr. 3, 2019, the entire disclosure of which is incorporated herein by reference in its entirety.

BACKGROUND

Field

Apparatuses and methods consistent with exemplary embodiments relate to an apparatus and method for automatically generating a boiler combustion model and more particularly, to an apparatus and method for automatically generating a boiler combustion model periodically or aperiodically through automated learning which is performed based on data of real-time measurements.

Description of the Related Art

Boilers in coal-fired power plants use exothermic reactions occurring in coal burning to heat water and produce steam for power generation. During this process, polluted exhaust gas containing nitrogen oxide undesirably occurs. When the amount of such polluted exhaust gas increases, the cost for treating the polluted exhaust gas accordingly increases. Furthermore, when incomplete combustion of coal takes place, the combustion efficiency is reduced, resulting in increases in power generation cost and power plant operation cost. Therefore, there is a demand for a boiler combustion optimization apparatus for reducing the generation of polluted exhaust gas while increasing combustion efficiency.

SUMMARY

Aspects of one or more exemplary embodiments provide an apparatus and method for automatically generating a boiler combustion model periodically or aperiodically through automated learning performed based on data of real-time measurements.

Additional aspects will be set forth in part in the description which follows and, in part, will become apparent from the description, or may be learned by practice of the exemplary embodiments.

According to an aspect of an exemplary embodiment, there is provided a method of automatically generating a boiler combustion model, the method including: determining whether a specific event has occurred in association with a boiler; changing a training condition according to a result of the determining; generating a boiler combustion model trained on operation data measured in the boiler and stored in a database according to the training condition; and determining a precision of the generated boiler combustion model.

The determining of whether the specific event has occurred may include detecting at least one event selected from among a restart of a power plant, a change in characteristic of data stored in the database, and a change in characteristic of the power plant.

The changing the training condition may include changing the latest operation data stored in the database in response to determining that the specific event has occurred.

The changing the training condition may include deleting abnormal operation data measured and stored immediately before an occurrence of the specific event in response to determining that the specific event has occurred.

The changing the training condition may include converting abnormal operation data measured and stored immediately before an occurrence of the specific event into normal operation data in response to determining that the specific event has occurred.

The generating the boiler combustion model may include generating a periodic boiler combustion model at regular time intervals in response to determining that the specific event has not occurred and generating an aperiodic boiler combustion model in response to determining that the specific event has occurred.

The latest operation data may be set as test data and the other operation data may be set as training data.

The generating the boiler combustion model may include training a boiler combustion model on the training data and testing the generated boiler combustion model with the test data.

According to an aspect of another exemplary embodiment, there is provided a non-transitory computer readable storage medium storing a computer program comprising instructions for performing the method of automatically generating the boiler combustion model.

According to an aspect of another exemplary embodiment, there is provided an apparatus for automatically generating a boiler combustion model, the apparatus including: a database configured to store operation data measured in a boiler; a training condition changer configured to determine whether a specific event has occurred in association with the boiler and change a training condition according to whether the specific event has occurred; a model generator configured to generate a boiler combustion model trained on the operation data stored in the database according to the training condition; and a precision determiner configured to determine a precision of the boiler combustion model.

The training condition changer may detect at least one event selected from among a restart of a power plant, a change in the operation data stored in the database, and a change in operation characteristic of the power plant based on a notification signal externally transmitted.

In response to determining that the specific event has occurred, the training condition changer may delete abnormal operation data measured and stored immediately before an occurrence of the specific event.

In response to determining that the specific event has occurred, the training condition changer may convert abnormal operation data measured and stored immediately before an occurrence of the specific event into normal operation data.

The model generator may generate a periodic boiler combustion model at regular time intervals in response to determining that the specific event has not occurred and generate an aperiodic boiler combustion model in response to determining that the specific event has occurred.

The latest operation data may be set as test data and the other operation data may be set as training data.

The model generator may learn from the training data to generate the boiler combustion model and test the generated boiler combustion model with the test data.

The precision determiner may determine precision of the generated boiler combustion model by comparing an optimal boiler combustion model stored in the database and the generated boiler combustion model.

According to an aspect of another exemplary embodiment, there is provided a system for automatically generating a boiler combustion model, the system including: an automatic tuning manager configured to determine a combustion model and a combustion controller based on tag data information measured in real time, determine whether to perform combustion optimization, and determine whether to perform learning for tuning the combustion model and the combustion controller; a data preprocessor configured to perform data preprocessing using the tag data information and data information of a tag previously stored; a data analyzer configured to perform sampling to select data required for design of the combustion model and the combustion controller through pattern analysis of the data, and select an input variable through correlation analysis for the design of the combustion model; a combustion model design algorithm configured to design the combustion model based on an input of fuel input, an air input, an air temperature, a water input, or an air temperature; a boiler combustion controller designing system configured to design the combustion controller using the combustion model to generate an optimal target value for optimal combustion control; an optimal model/controller selector configured to select the most optimal combustion model and the combustion controller from a plurality of existing combustion models and combustion controllers obtained based on an analysis result of current data; and a combustion optimization algorithm configured to calculate the optimal target value by inputting the current data to the optimal combustion model and the combustion controller.

The combustion model design algorithm may include a database configured to store operation data measured in a boiler, a training condition changer configured to determine whether a specific event has occurred in association with the boiler and change a training condition according to whether the specific event has occurred, a model generator configured to generate a boiler combustion model trained on the operation data stored in the database according to the training condition, and a precision determiner configured to determine a precision of the boiler combustion model.

One or more exemplary embodiments can generate a boiler combustion model through automated learning performed based on real-time operation data measured in a boiler.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
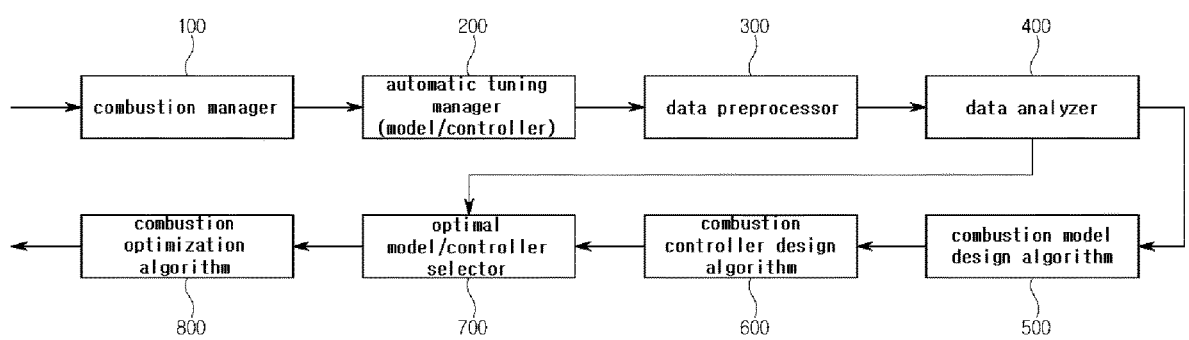
FIG. 1 is a diagram illustrating an apparatus for optimizing combustion of a boiler according to an exemplary embodiment.

Various modifications and various embodiments will be described in detail with reference to the accompanying drawings so that those skilled in the art may easily implement the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

The functional blocks illustrated in the drawings and described below are only examples of possible implementations. Other functional blocks may be used in other implementations without departing from the spirit and scope of the detailed description. Also, while one or more functional blocks of the present disclosure are represented by separate blocks, one or more of the functional blocks may be a combination of various hardware and software configurations that perform the same function.

Also, "a module" or "a part" in the disclosure perform at least one function or operation, and these elements may be implemented as hardware or software, or as a combination of hardware and software. Further, a plurality of "modules" or "parts" may be integrated into at least one module and implemented as at least one processor, except "modules" or "parts" that need to be implemented as specific hardware.

The terminology used herein is for the purpose of describing specific embodiments only and is not intended to limit the scope of the disclosure. The singular expressions "a", "an", and "the" are intended to include the plural expressions as well, unless the context clearly indicates otherwise. When an element is referred to as being "on" another element, it can be directly on the other element or intervening elements may be present therebetween.

In the disclosure, the terms such as "comprise", "include", "have/has" should be construed as designating that there are such features, regions, integers, steps, operations, elements, components, and/or combinations thereof, not to exclude the presence or possibility of adding of one or more of other features, regions, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a diagram illustrating a boiler combustion optimization apparatus for optimizing combustion of a boiler according to an exemplary embodiment.

Referring to FIG. 1, the boiler combustion optimization apparatus may include a combustion manager 100, an automatic tuning manager 200, a data preprocessor 300, a data analyzer 400, and a combustion model design algorithm 500, a combustion controller design algorithm 600, an optimal model/controller selector 700, and a combustion optimization algorithm 800.

The combustion manager 100 performs overall control of the optimization of combustion. For example, the combustion manager 100 determines whether to perform combustion optimization based on tag data information measured or calculated in real time. In addition, when the combustion manager 100 is used in a power plant, the combustion manager 100 determines whether to perform combustion optimization based on distributed control system (DCS) values such as a generator output of a power plant, a change in output, a chute blower operation state, a boiler logic operation, and the like.

The automatic tuning manager 200 manages a combustion model and a combustion controller. For example, the automatic tuning manager 200 determines whether to tune the combustion model and the combustion controller based on information such as tag data information measured or calculated in real time, information of whether combustion optimization is performed, information of whether learning for tuning the model and the controller is performed, and the like. Here, the automatic tuning manager 200 activates the combustion model design algorithm 500 and the combustion controller design algorithm 600 if it is determined that the combustion model and the combustion controller need to be tuned. However, if it is determined that the combustion controller does not need to be tuned, the automatic tuning manager 200 does not activate the combustion model design algorithm 500 and the combustion controller design algorithm 600.

The data preprocessor 300 performs data preprocessing using tag data information measured or calculated in real time and tag data information stored in the database. For example, the data preprocessor 300 may perform signal processing, normal data processing (based on knowledge or data), and outlier processing. Through this processing, the data preprocessor 300 may remove data that has a negative effect on the removal of noise in the data, the generation of a combustion model, and on designing a controller.

The data analyzer 400 performs pattern analysis and sampling on data to select only important data obtained in a normal state required to design the combustion model and the combustion controller. Further, the data analyzer 400 selects input variables having a significant influence on a model output through correlation analysis to design the combustion model.

The combustion model design algorithm 500 refers to an algorithm used to design a combustion model which is one of the most important factors in optimizing the combustion of a boiler. The combustion model design algorithm 500 is used to design a combustion model which may predict important combustion parameters including a generator output, a combustion state including temperature of steam and exhaust gas, a composition of exhaust gas, and concentration of oxygen after combustion based on inputs including a feed rate of fuel, a feed rate of air, air temperature, a feed rate of water, water temperature, and the like.

The combustion model design algorithm 600 may be an algorithm used to design a combustion controller which is one of the most important factors in optimizing the combustion of a boiler. The combustion controller design algorithm 600 serves to make the combustion controller which is designed according to the combustion model to produce a labeled value (i.e., target value) for the optimal combustion.

The optimal model/controller selector 700 selects the optimal combustion model and the optimal combustion controller from among several candidates that are obtained in advance based on the analysis of the current data.

The combustion optimization algorithm 800 calculates optimal target values for the combustion optimization by inputting the current data to the optimal combustion model and the optimal combustion controller. In addition, the combustion optimization algorithm 800 calculates optimal control target values and associated auxiliary values by using target values in the current distributed control system (DCS) and a manual.

Here, the apparatus for automatically generating a boiler combustion model according to an exemplary embodiment corresponds to the combustion model design algorithm 500. The apparatus automatically learns from operation data measured in the boiler and generates a boiler combustion model that is trained on the operation data. That is, it is possible to generate a boiler combustion model on which combustion characteristics of the boiler are reflected in real time.

Figure 2:
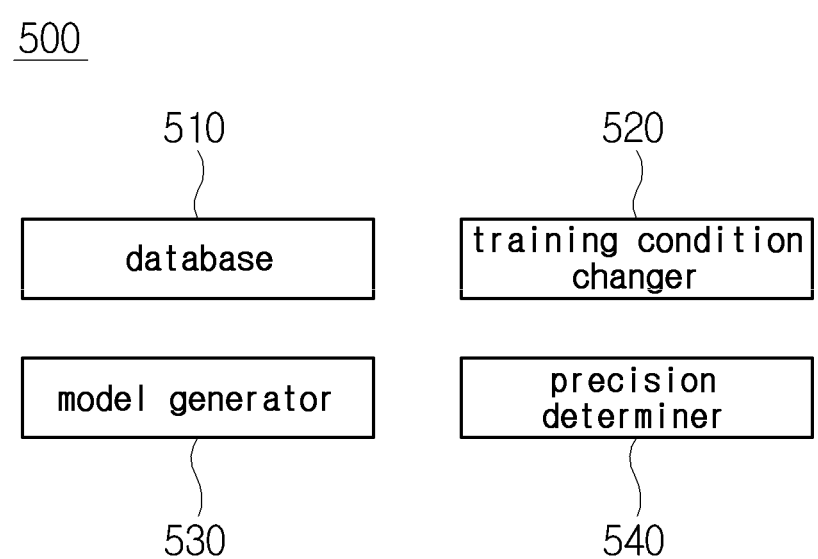
FIG. 2 is a diagram illustrating a construction of an apparatus for automatically generating a boiler combustion model according to an exemplary embodiment.

FIG. 2 is a diagram illustrating a construction of an apparatus for automatically generating a boiler combustion model according to an exemplary embodiment.

Referring to FIG. 2, the boiler combustion model generation apparatus 500 may include a database 510, a training condition changer 520, a model generator 530, and a precision determiner 540. The training condition changer 520, the model generator 530, and the precision determiner 540 can be implemented as one or more processor configured to perform corresponding functions. For example, the one or more processor may be a CPU (central processing unit), MPU (micro processing unit), FPGA (field programmable gate array), MCU (micro controller unit), GPU (graphics processing unit), or ASIC (application specific integrated circuit), but not limited thereto.

The database 510 contains data used to train a boiler combustion model. For example, seed data may be input to the database 510 by experts. The seed data is data including parameters at which the boiler optimally operates. The seed data is data verified with experiments and iterative operations over a long period. The seed data may be stored in the database 510 in advance (e.g., in the designing stage) and may be manually modified or deleted later by experts. However, the seed data may not be automatically modified or deleted. That is, an access to the database 510 is limited to authorized experts.

The data stored in the database 510 may be boiler operation data that performed preprocessing and sampling. The operation data refers to data of measurements measured in real time in the boiler. The latest data that is most recently measured is continuously input to the database 510. If the database 510 is full of data (i.e., there is no more available space in the database 510), the oldest data stored in the database 510 is deleted to make room for new data so that new data can be input to and stored in the database 510. That is, the database 510 can be updated.

Accordingly, because a boiler combustion model is generated based on the operation data stored in the database 510 that is updated in real time, it is possible to generate a boiler combustion model on which real-time operation characteristics of the boiler are reflected.

An optimal boiler combustion model may be stored in the database 510. The optimal boiler combustion model stored in the database 510 is a boiler combustion model that best mimics the actual operation of the boiler among multiple boiler combustion models. A boiler combustion model that is determined as an optimal boiler combustion model among multiple boiler combustion models generated by the model generator 530 may be stored in the database 510. Here, the data measured in the boiler and the optimum boiler combustion model may be stored in different storage areas in the database 510.

The training condition changer 520 determines whether a specific event has occurred in association with the boiler and changes the training condition according to the results of the determination. Here, the specific event may include a restart of a power plant, a change in data stored in the database 510, a change in operation characteristic of the power plant, and the like.

The training condition changer 520 detects at least one event among a restart of the power plant, a change in data stored in the database 510, and a change in operation characteristic of the power plant based on a notification signal that is transmitted from outside. For example, the training condition changer 520 may detect the output of the generator based on the notification signal. The training condition changer 520 may determine that the power plant is restarted when the output decreases to the minimum (e.g., 0V) and then increases.

The training condition changer 520 may change the operation data stored in the database 510 if it is determined that a specific event has occurred in association with the boiler. That is, if the power plant is restarted after a fault is fixed, the data measured immediately before the power plant is restarted is highly likely to be data measured in an abnormal operation state. Therefore, this data may be abnormal operation data. Accordingly, the training condition changer 520 may delete the data measured immediately before the specific event or may convert the abnormal operation data into normal operation data.

However, the training condition changer 520 may not change the operation data stored in the database 510 if it is determined that the specific event has occurred in the boiler. That is, the operation data that is stored in the database 510 in a chronological sequence may be maintained.

The model generator 530 generates a boiler combustion model by learning from the operation data stored in the database 510 according to a training condition. The model generator 530 may generate a periodic boiler combustion model or an aperiodic boiler combustion model according to the results of the determination of whether a specific event has occurred in association with the boiler determined by the training condition changer 520. That is, the model generator 530 may generate a periodic boiler combustion model at regular intervals regardless of the determination of whether a specific event has occurred. However, if a specific event has occurred, the model generator 530 may generate an aperiodic boiler combustion model.

Here, the model generator 530 may have a single model learning module. In this case, if a specific event has occurred, the model generator 530 may put a higher priority to an aperiodic boiler combustion model that is to be generated aperiodically than to a periodic boiler combustion model that is to be generated periodically. That is, the model generator 530 may assign a task of generating a periodic boiler combustion model to the single model learning module. In this case, if a specific event occurs in association with the boiler, the model generator 530 may temporarily stop the generation of a periodic boiler combustion model and generate an aperiodic boiler combustion model. That is, the model generator 530 may assign a task of generating an aperiodic boiler combustion model to the single model learning module, thereby generating an aperiodic boiler combustion model.

Alternatively, the model generator 530 may have a plurality of model learning modules. In this case, the model generator 530 may distribute a task of generating an aperiodic boiler combustion model to one or more model learning modules among the plurality of model learning modules. That is, the model generator 530 may generate periodic boiler combustion models by assigning the task of generating a periodic boiler combustion model to part of the plurality of model learning modules. In this case, if a specific event occurs, the model generator 530 may generate an aperiodic boiler combustion model by allocating the task of generating an aperiodic boiler combustion model to the distributed model learning modules.

The precision determiner 540 determines a precision of the boiler combustion model generated by the model generator 530 based on the operation data stored in the database 510. Here, the precision determiner 540 may determine the precision of the boiler combustion model by determining an accuracy of the boiler combustion model, a loss function, a mean square error, and the like. If it is determined that the precision of the optimal boiler combustion model stored in the database 510 is higher than a preset precision level, the precision determiner 540 may maintain the optimal boiler combustion model stored in the database 510. Here, the model with higher precision may represent a model that more similarly describes the actual operation of the boiler.

In addition, the precision determiner 540 may compare precisions of the boiler combustion models generated by the model generator 530. The precision determiner 540 compares the precision of the optimum boiler combustion model stored in the database 510 with the precision of the boiler combustion model generated by the model generator 530. If the comparison concludes that the precision of the boiler combustion model generated by the model generator 530 is higher than that of the optimal boiler combustion model stored in the database 510, the boiler combustion model generated by the model generator 530 may be stored in the database 510 as the optimal boiler combustion model.

Figure 3:
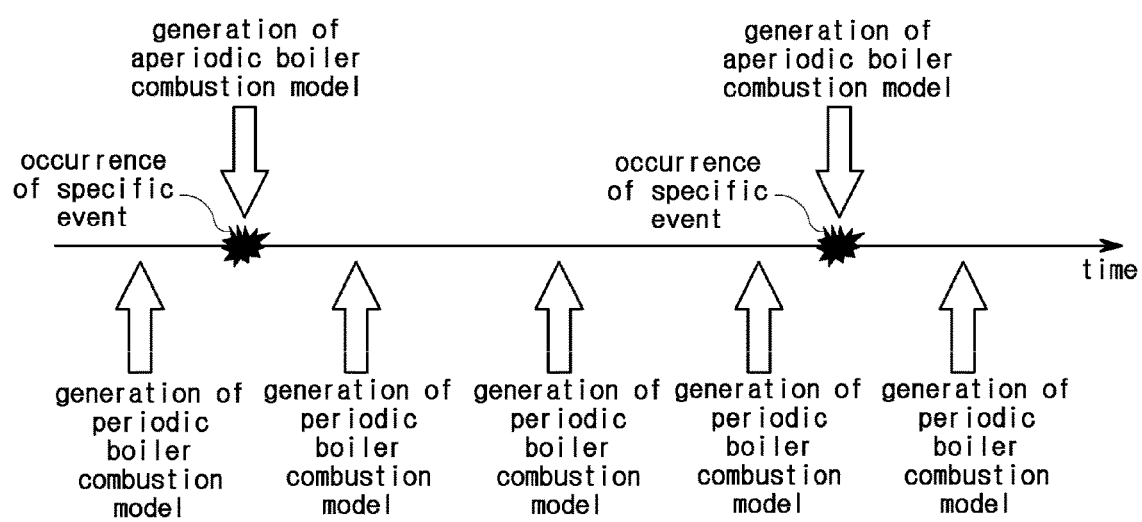
FIG. 3 is a diagram illustrating occurrences of generation of a boiler combustion model according to an exemplary embodiment.

FIG. 3 is a diagram illustrating occurrences of generation of a boiler combustion model according to an exemplary embodiment.

Referring to FIG. 3, the model generator 530 may generate a periodic boiler combustion model at regular intervals. If a specific event occurs, the model generator 530 may generate an aperiodic boiler combustion model.

For example, the training condition changer 520 may determine whether a specific event has occurred in association with the boiler based on a notification signal transmitted from outside. Here, the specific event may be a restart of the power plant, a change in data stored in the database 510, a change in operation characteristic of the power plant, or the like.

The training condition changer 520 may change the operation data stored in the database 510 if it is determined that the specific event has occurred in association with the boiler. That is, the training condition changer 520 may delete the data (i.e., abnormal data) measured immediately before the occurrence of the specific event or replace it with normal data (i.e., data measured in a normal operation state).

On the contrary, the training condition changer 520 may not change but maintain the operation data stored in the database 510 if it is determined that the specific event has not occurred in the boiler.

The model generator 530 may generate a periodic boiler combustion model or an aperiodic boiler combustion model according to the results of the determination of whether a specific event has occurred in association with the boiler determined by the training condition changer 520.

That is, the model generator 530 may generate a periodic boiler combustion model at regular time intervals if a specific event does not occur, and generate an aperiodic boiler combustion model if a specific event occurs.

Here, the model generator 530 may prioritize generation of the aperiodic boiler combustion model over generation of the periodic boiler combustion model. That is, if a specific event associated with the boiler is detected when a periodic boiler combustion model is scheduled to be generated, the model generator 530 may temporarily stop the generation of the periodic boiler combustion model and generate an aperiodic boiler combustion model.

Figure 4:
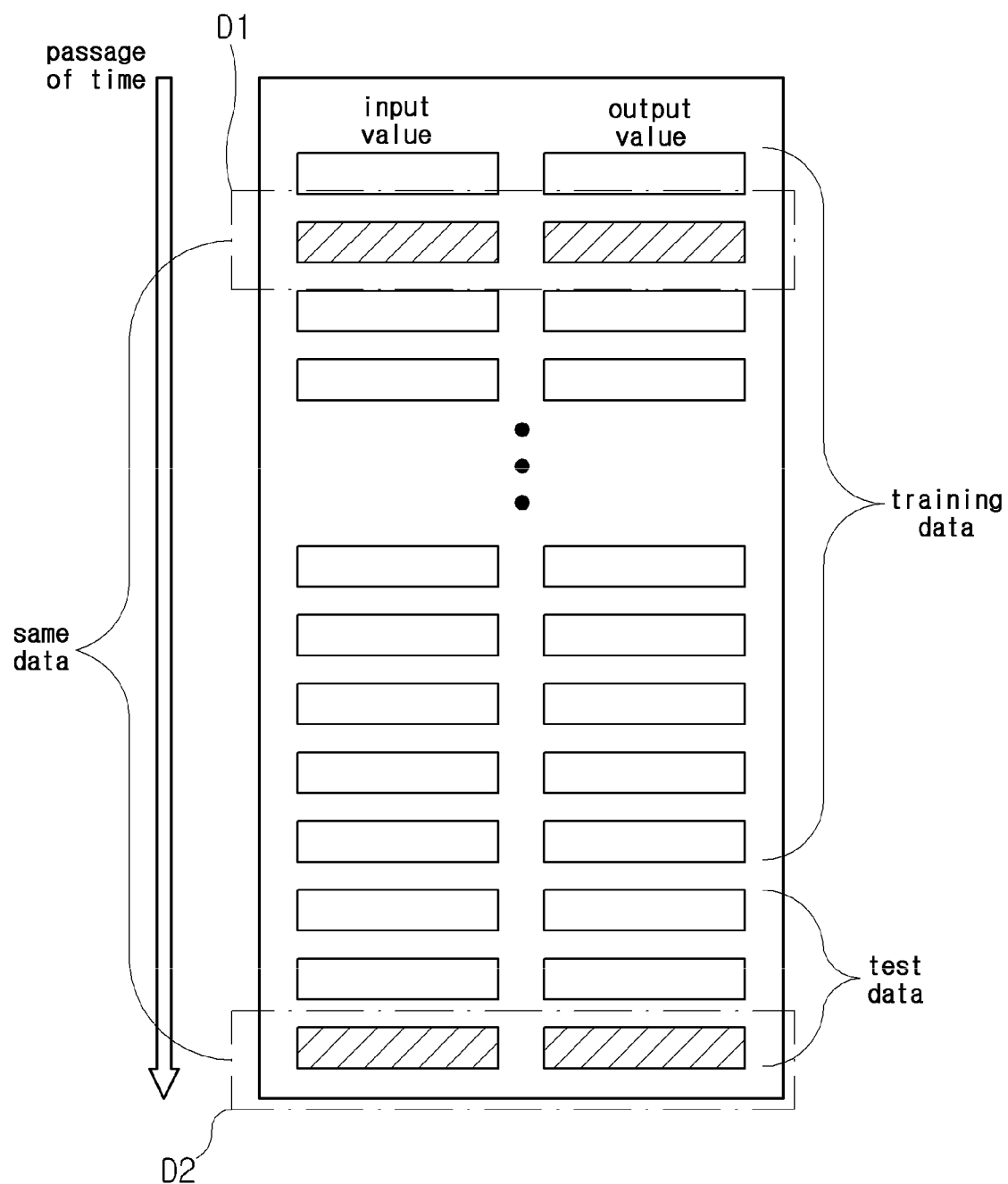
FIG. 4 is a diagram illustrating a data structure of a database according to an exemplary embodiment.

FIG. 4 is a diagram illustrating a data structure of a database according to an exemplary embodiment.

Referring to FIG. 4, the database 510 may store data measured in real time in the boiler. Here, the database 510 may store seed data that is input by an expert. In addition, the operation data may be pairs of an input vector (or scalar) and an output vector (or scalar) which will be separately stored in the database 510. The input vector may refer to a parameter at which the boiler operates and the output vector may refer to the result of the operation of the boiler.

The operation data may be divided into training data and test data. The latest operation data may be classified as the test data, and the remaining of the operation data may be classified as the training data. Here, the operation data may be arbitrarily divided into the training data and the test data to generate a boiler combustion model and to test the generated boiler combustion model for the precision. The training data and the test data may be respectively used in the model generator 530 and the precision determiner 540.

For example, the model generator 530 may generate a boiler combustion model by learning from the training data, and the precision determiner 540 may test the boiler combustion model generated by the model generator 530 for the precision based on the test data. Here, the precision determiner 540 may input the input values of the test data to the boiler combustion model generated by the model generator 530 and compare the output values output from the boiler combustion model with the output values of the test data D2, thereby determining the precision of the generated boiler combustion model.

In this case, the precision determiner 540 may select a boiler combustion model that outputs the output value having a smallest error with respect to the output value of the test data D2 among the boiler combustion models generated by the model generator 530. Alternatively, if the error of the boiler combustion model generated by the model generator 530 is smaller than that of each of the boiler combustion models stored in the database 510, the precision determiner 540 may determine the boiler combustion model generated by the model generator 530 as the optimal boiler combustion model.

The database 510 may not store new data D2 that is most recently measured if the new data D2 is same as old data D1 that is previously measured and stored in the database 510. That is, if the input value and the output value of the new data D2, which are respectively equal to the input value and the output value of the old data D1 stored in the database 510, are measured, the database 510 may not store the new data D2. This saves the storage space by not storing redundant data which is same as old data stored in the database 510.

In addition, if data measured in the boiler includes the value "null", the data may not be stored in the database 510. If data measured in real time in the boiler includes the value "null", it is determined that the measurement of the data is inappropriately performed due to some errors such as a fault of a measuring device. Accordingly, because the data including the value "null" is not stored in the database 510, it is possible to prevent the database 510 from having abnormal data and to save the storage space for the database 510.

In addition, the database 510 may not store data measured in a state in which NOx, CO, and operation load are not in normal ranges. In the case in which a boiler combustion model is generated based on data measured in a state in which NOx, CO, and operation load are not in normal ranges, the data output from the boiler combustion model is not likely to be in a normal range. That is, because data measured in a state in which NOx, CO, and operation load are not in normal ranges is not stored in the database 510, it is possible to prevent a boiler combustion model from being generated based on abnormal data and to save storage space for the database 510.

Figure 5:
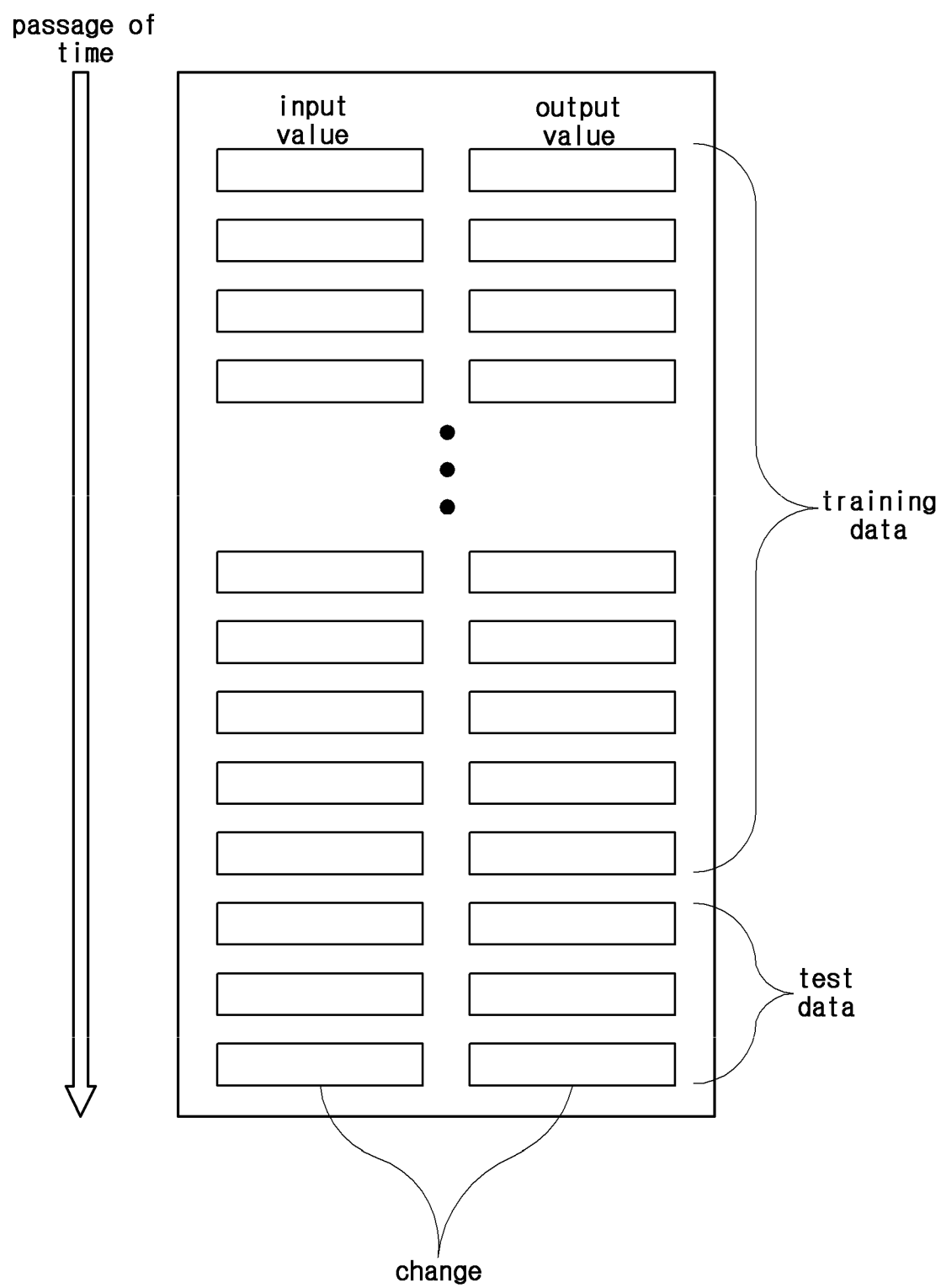
FIG. 5 is a diagram illustrating a change in training condition according to an exemplary embodiment.

FIG. 5 is a diagram illustrating a change in training condition according to an exemplary embodiment.

Referring to FIG. 5, the training condition changer 520 may determine whether a specific event has occurred in association with the boiler based on a notification signal transmitted from the outside. The training condition changer 520 may not change the operation data stored in the database 510 if it is determined that a specific event has not occurred in association with the boiler. Therefore, the model generator 530 may generate a periodic boiler combustion model by using operation data stored in the database 510.

On the other hand, the training condition changer 520 may change the training condition if it is determined that a specific event has occurred in the boiler. Here, the training condition refers to the operation data stored in the database 510. Therefore, the changing of the training condition means changing the operation data.

That is, if the power plant is restarted after a fault is fixed, the data measured immediately before the power plant is restarted is data measured in an abnormal operation state. The data may be abnormal data. Therefore, the training condition changer 520 may delete the data measured immediately before the occurrence of the specific event or may convert the abnormal operation data into normal operation data.

In this case, the model generator 530 may generate an aperiodic boiler combustion model based on the operation data that is changed by the training condition changer 520.

Figure 6:
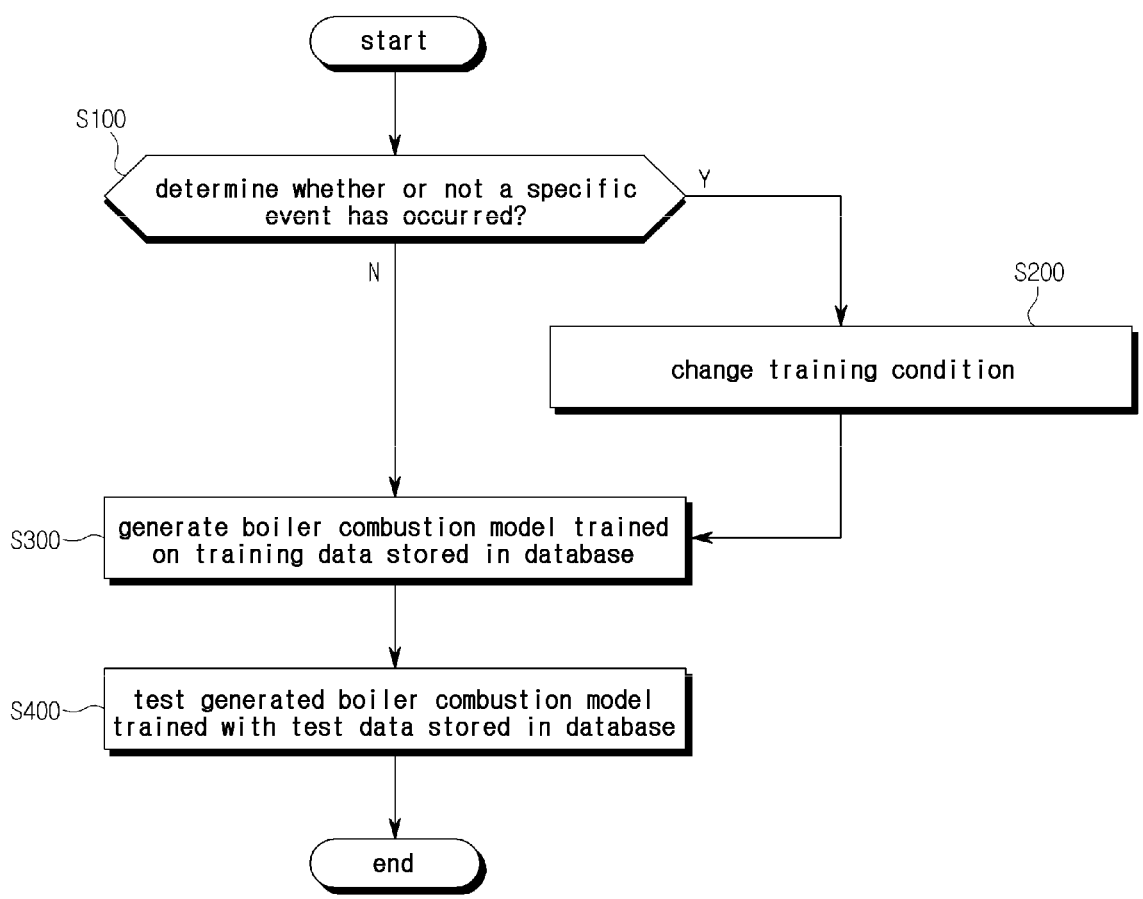
FIG. 6 is a flowchart illustrating a method for automatically generating a boiler combustion model according to an exemplary embodiment.

FIG. 6 is a flowchart illustrating a method for automatically generating a boiler combustion model according to an exemplary embodiment.

Referring to FIG. 6, a training condition changer 520 may determine whether a specific event has occurred in a boiler (operation S100). For example, the training condition changer 520 may determine whether a specific event has occurred in the boiler based on a notification signal transmitted from the outside. Here, the specific event may be a restart of a power plant, a change in data stored in a database 510, a change in operation characteristic of the power plant, or the like.

If a specific event occurs in the boiler, the training condition changer 520 may change a training condition (operation S200). If a specific event occurs in the boiler, the training condition changer 520 may change operation data stored in the database 510. The training condition changer 520 may delete the latest operation data stored in the database 510 or change the latest operation data into normal operation data.

Next, the model generator 530 may generate a boiler combustion model that is trained based on the changed operation data (i.e., changed training condition) (operation S300). In addition, the model generator 530 may generate a boiler combustion model if a specific event has not occurred (operation S300).

Therefore, the model generator 530 may generate periodic boiler combustion models by using the operation data stored in the database 510.

A precision determiner 540 may determine the precision of the boiler combustion model generated by the model generator 530 based on test data stored in the database 510 (operation S400). Here, the precision determiner 540 may determine the precision of the boiler combustion model by assessing the accuracy, the loss function, the mean square error, and the like of the boiler combustion model. If it is determined that the precision of a boiler combustion model stored in the database 510 is higher than a preset precision level, the precision determiner 540 may maintain the boiler combustion model as the optimal boiler combustion model in the database 510. Here, the model with higher precision may refer to a model more similarly describes an actual operation of the boiler.

In addition, the precision determiner 540 may compare the precisions of the boiler combustion models generated by the model generator 530. The precision determiner 540 may compare the precision of an existing optimum boiler combustion model with the precision of the boiler combustion model generated by the model generator 530. If the comparison concludes that the precision of the boiler combustion model generated by the model generator 530 is higher than that of the existing optimal boiler combustion model stored in the database 510, the boiler combustion model generated by the model generator 530 may be stored in the database 510 as an optimal boiler combustion model.

As described above, according to the exemplary embodiments, through automated learning from real-time data measured by a boiler, it is possible to implement an apparatus and a method for automatically generating a boiler combustion model periodically or aperiodically.

Meanwhile, various methods according to exemplary embodiments described above can be implemented in the form of a readable program through various computer means and recorded in a computer-readable recording medium and executed by a processor.

The recording medium can store a relational database, a non-relational database, an in-memory database, or data that can be accessible directly or indirectly regardless of whether it is in a raw state, a formatted state, an organized state, or an arbitrary accessible state. The recording medium can store other suitable databases such as a database that is distributed among multiple sources and which allows a recording controller to access thereto. In addition, examples of the recording medium may be arbitrary types of storage devices, such as a primary storage device, a secondary storage device, a tertiary storage device, an offline storage device, a volatile storage device, a nonvolatile storage device, a semiconductor storage device, a magnetic storage device, an optical storage device, and a flash storage device, a hard disk drive storage devices, a floppy disk drive, a magnetic tape, or other suitable data storage media.

In the exemplary embodiments, the instructions may be assembler instructions, instruction-set-architecture (ISA) instructions, machine instructions, machine dependent instructions, microcode instructions, firmware instructions, state setting data, or source code or object code instructions written in one or more programming languages, in combination, including object-oriented programming languages, such as Smalltalk, C++, and the like and existing procedural programming languages such as "C" or similar programming languages.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A method of automatically generating a boiler combustion model, the method comprising:
   determining whether a specific event has occurred in association with a boiler;
   changing a training condition according to a result of the determining;
   generating a boiler combustion model trained on operation data measured in the boiler and stored in a database according to the training condition; and
   determining a precision of the generated boiler combustion model.

2. The method according to claim 1, wherein the determining of whether the specific event has occurred comprises detecting at least one event selected from among a restart of a power plant, a change in characteristic of data stored in the database, and a change in characteristic of the power plant.

3. The method according to claim 1, wherein the changing the training condition comprises changing the latest operation data stored in the database in response to determining that the specific event has occurred.

4. The method according to claim 1, wherein the changing the training condition comprises deleting abnormal operation data measured and stored immediately before an occurrence of the specific event in response to determining that the specific event has occurred.

5. The method according to claim 1, wherein the changing the training condition comprises converting abnormal operation data measured and stored immediately before an occurrence of the specific event into normal operation data in response to determining that the specific event has occurred.

6. The method according to claim 1, wherein the generating the boiler combustion model comprises generating a periodic boiler combustion model at regular time intervals in response to determining that the specific event has not occurred and generating an aperiodic boiler combustion model in response to determining that the specific event has occurred.

7. The method according to claim 1, wherein the latest operation data is set as test data and the other operation data are set as training data.

8. The method according to claim 7, wherein the generating the boiler combustion model comprises training a boiler combustion model on the training data and testing the generated boiler combustion model with the test data.

9. The method according to claim 7, wherein the determining the precision comprises comparing an optimal boiler combustion model stored in the database and the generated boiler combustion model and determining the precision of the generated boiler combustion model.

10. A non-transitory computer readable storage medium storing a computer program comprising instructions for executing the method according to claim 1.

11. An apparatus for automatically generating a boiler combustion model, the apparatus comprising:
- a database configured to store operation data measured in a boiler;
- a training condition changer configured to determine whether a specific event has occurred in association with the boiler and change a training condition according to whether the specific event has occurred;
- a model generator configured to generate a boiler combustion model trained on the operation data stored in the database according to the training condition; and
- a precision determiner configured to determine a precision of the generated boiler combustion model.

12. The apparatus according to claim 11, wherein the training condition changer detects at least one event selected from among a restart of a power plant, a change in the operation data stored in the database, and a change in operation characteristic of the power plant based on a notification signal externally transmitted.

13. The apparatus according to claim 11, wherein in response to determining that the specific event has occurred, the training condition changer deletes abnormal operation data measured and stored immediately before an occurrence of the specific event.

14. The apparatus according to claim 11, wherein in response to determining that the specific event has occurred, the training condition changer converts abnormal operation data measured and stored immediately before an occurrence of the specific event into normal operation data.

15. The apparatus according to claim 11, wherein the model generator generates a periodic boiler combustion model at regular time intervals in response to determining that the specific event has not occurred and generates an aperiodic boiler combustion model in response to determining that the specific event has occurred.

16. The apparatus according to claim 11, wherein the latest operation data is set as test data and the other operation data are set as training data.

17. The apparatus according to claim 16, wherein the model generator learns from the training data to generate the boiler combustion model and tests the generated boiler combustion model with the test data.

18. The apparatus according to claim 11, wherein the precision determiner determines precision of the generated boiler combustion model by comparing an optimal boiler combustion model stored in the database and the generated boiler combustion model.

* * * * *